(12) United States Patent
Malsam

(10) Patent No.: US 9,771,114 B1
(45) Date of Patent: Sep. 26, 2017

(54) FOOT PEG EXTENSIONS

(71) Applicant: Adam P. Malsam, Aberdeen, SD (US)

(72) Inventor: Adam P. Malsam, Aberdeen, SD (US)

( * ) Notice: Subject to any disclaimer, the term of this patent is extended or adjusted under 35 U.S.C. 154(b) by 19 days.

(21) Appl. No.: 14/580,941

(22) Filed: Dec. 23, 2014

Related U.S. Application Data

(60) Provisional application No. 61/953,134, filed on Mar. 14, 2014.

(51) Int. Cl.
*G05G 1/60* (2008.04)
*B62J 25/00* (2006.01)

(52) U.S. Cl.
CPC ..................... *B62J 25/00* (2013.01)

(58) Field of Classification Search
CPC ................................ G05G 1/60; B62J 25/00
USPC ........................................................ 74/564
See application file for complete search history.

(56) References Cited

U.S. PATENT DOCUMENTS

| | | | | |
|---|---|---|---|---|
| 1,261,442 | A * | 4/1918 | Rigby | B62J 25/00 280/291 |
| 4,287,960 | A | 9/1981 | McConnell | |
| 4,456,090 | A * | 6/1984 | Malenotti | 180/219 |
| 4,706,774 | A | 11/1987 | Tsuboi | |
| 5,209,509 | A * | 5/1993 | Gay et al. | 280/304.1 |
| 5,529,141 | A | 6/1996 | Lehman et al. | |
| 5,779,254 | A * | 7/1998 | James | B62J 25/00 180/219 |
| 5,899,291 | A | 5/1999 | Dumais | |
| 6,152,474 | A * | 11/2000 | Rupert | 280/291 |
| 6,217,050 | B1 * | 4/2001 | Dickie et al. | 280/291 |
| 6,688,629 | B2 * | 2/2004 | Essinger | 280/291 |
| 6,719,316 | B1 * | 4/2004 | Anthony | B62J 25/00 280/291 |
| 6,739,420 | B2 | 5/2004 | Mullins | |
| D502,431 | S | 3/2005 | Matthies | |
| 6,957,821 | B2 * | 10/2005 | Gorman | B62J 25/00 280/291 |
| 7,111,375 | B2 * | 9/2006 | Buckhouse et al. | 29/428 |
| 7,425,010 | B2 * | 9/2008 | Harris | A61G 5/128 280/304.1 |
| 7,497,291 | B1 * | 3/2009 | McKim | 180/90.6 |
| 7,828,315 | B2 * | 11/2010 | Owyang | 280/291 |
| 7,918,300 | B2 | 4/2011 | Barns | |
| 9,352,795 | B2 * | 5/2016 | Parvey | B62J 25/00 |
| 2005/0116443 | A1 * | 6/2005 | Egan | 280/291 |
| 2007/0062327 | A1 * | 3/2007 | Kouchi et al. | 74/564 |
| 2010/0187792 | A1 * | 7/2010 | Warren | 280/291 |
| 2013/0093228 | A1 * | 4/2013 | Peek | 297/301.1 |

FOREIGN PATENT DOCUMENTS

WO 2006125320 A1 11/2006

OTHER PUBLICATIONS

Harley Davidson Street Glide Trike Footpeg Accessories. Datasheet [online]. J&P Cycles, 2012 [retrieved on Jun. 12, 2012]. Retrieved from the internet <URL: http:www.jpcycles.com/harley-street-glide-trike-footpeg-accessories.html>.

* cited by examiner

*Primary Examiner* — Vicky Johnson
(74) *Attorney, Agent, or Firm* — Robert C. Montgomery; Montgomery Patent & Design LP.

(57) ABSTRACT

A bracket kit adapted to be attached to a motorcycle so as to operatively move the passenger foot pegs forward from their standard position. The kit is believed to be particularly beneficial when installed upon a trike-style motorcycle due to limited leg room.

3 Claims, 5 Drawing Sheets

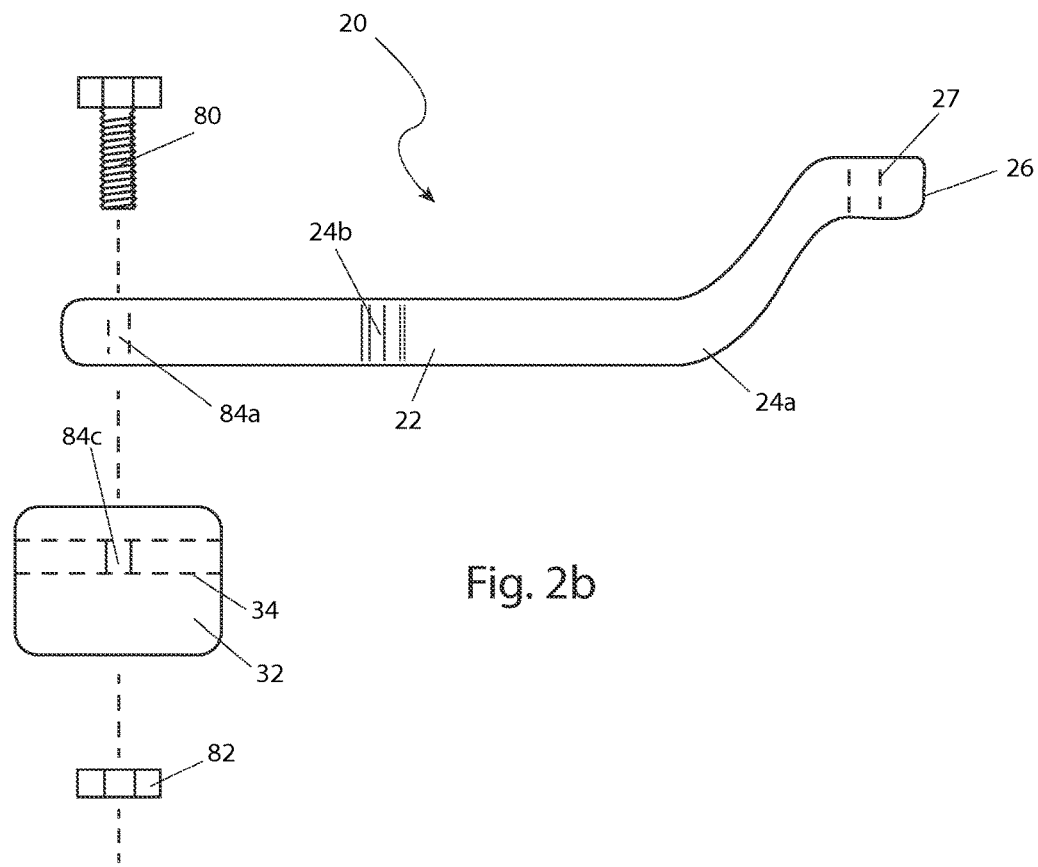
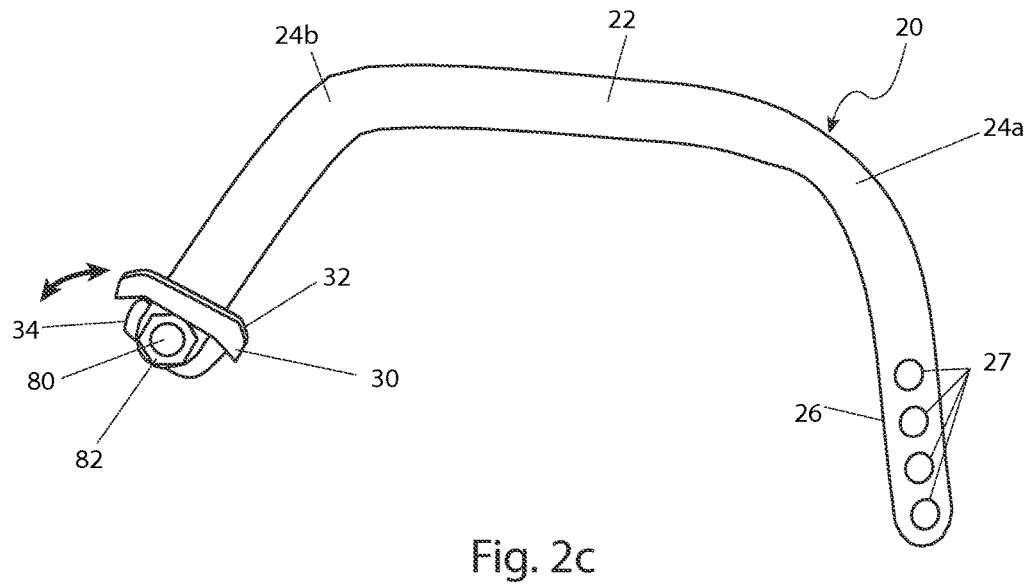
Fig. 2b
Fig. 2c

FOOT PEG EXTENSIONS

RELATED APPLICATIONS

The present invention was first described in and claims the benefit of U.S. Provisional Application No. 61/953,134, filed Mar. 14, 2014, the entire disclosures of which are incorporated herein by reference.

FIELD OF THE INVENTION

The present invention relates generally to a bracket adapted to be attached to a motorcycle so as to operatively move the passenger foot pegs forward from their standard position.

BACKGROUND OF THE INVENTION

Countless Americans enjoy riding motorcycles. The feeling of freedom and pure exhilaration while cruising about the countryside with the wind in your hair is a passion enjoyed by many. And, as with most passions, people are constantly looking for ways to stand out from others while enjoying their passions. Many people customize their motorcycle by accessorizing or painting them, but these efforts at individuation quickly fade into a sea of ubiquity when other people start doing the same thing. Also, there are many who are looking to customize their motorcycle, but do not want to impact its potential re-sale value. One (1) way people customize their motorcycles is to modify the motorcycle to provide additional comfort to the rider(s).

Providing features to increase the comfort level of traveling in a motorcycle, especially for passengers who ride behind the motorcycle operator, creates a more pleasant riding experience. Accordingly, there exists a need for a means by which a motorcycle can be modified or customized in an eye-catching manner, but also in a manner which is easy and reversible as well. The use of the present invention allows motorcycle owners the ability to customize their motorcycle, in a manner which is quick, easy, and effective.

SUMMARY OF THE INVENTION

The inventor has recognized the aforementioned issues and inherent problems and observed that there is a lack in the prior art for a means to easily move the passenger foot pegs of a motorcycle forward from their standard position.

It is therefore an object of the invention to provide a foot peg extension kit adapted to be attached to a motorcycle so as to operatively move the passenger foot pegs forward from their standard position. Each foot peg extension kit includes two (2) brackets each having an extension bar which extends outwardly. Each extension bar is configured to attach to the right and left side of a motorcycle respectively. Each bracket also has an adjustable foot rest plate which is itself removably and rotatably attached to each bracket.

Each foot rest plate is removably attached to the forward end of each extension bar. Each extension bar is made of steel bar stock and either covered with chrome or paint. Both extension bars each have a linear section and an offset and arcuate section between the rearward end and the forward end. The mounting surface of each bar comprises a plurality of equidistantly spaced mounting apertures and brackets which have an outwardly offset and generally "L"-shaped form and third bend.

Each foot rest plate has a platform with a slightly convex upper surface, a mounting ear portion integral to the platform which protrudes perpendicularly downward from the bottom surface, and a mounting ear which is rotatingly attached to each extension bar. Each foot rest plate is removabley attached and the arcuate top surface of the foot rest plate is capable of being rotatingly and selectively positioned by means of a fastener. Also each, foot rest plate has a textured high-friction pad located along a top surface of each platform. Each textured high-friction pad is adhesively bonded or otherwise affixed to each foot rest plate and is made of a water resistant non-slip material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2b is a top view of the left bracket 20, according to a preferred embodiment of the present invention;

FIG. 2c is a side view of the left bracket 20, according to a preferred embodiment of the present invention;

DETAILED DESCRIPTION OF THE PREFERRED EMBODIMENT

Figure 1:
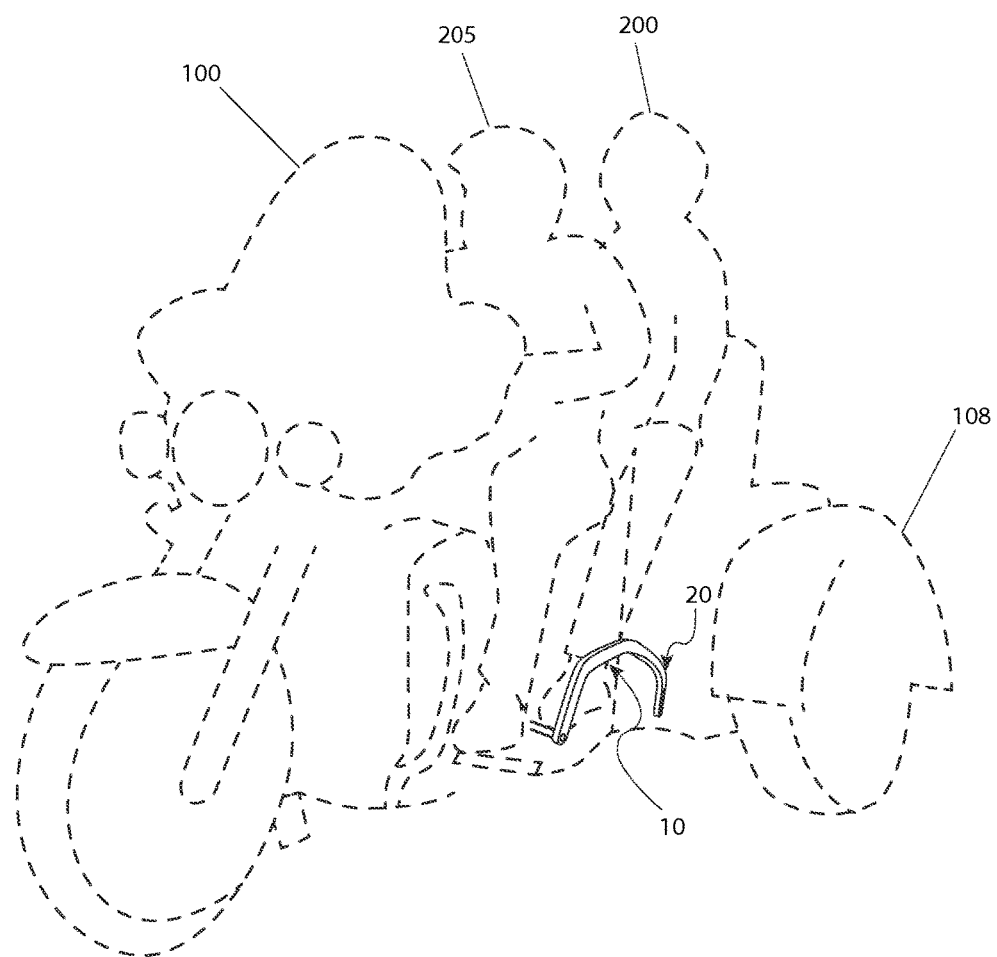
FIG. 1 is an environmental view of a foot peg extension kit 10 depicting and in-use state, according to a preferred embodiment of the present invention.

The best mode for carrying out the invention is presented in terms of its preferred embodiment, herein is depicted in FIGS. 1 through 3c. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a foot peg extension kit (herein described as the "kit") 10, which provides a means to provide additional leg comfort to a passenger 200 while riding upon a motorcycle 100 by extending and relocating both foot rest plates 30 using bolt-on left bracket 20 and right bracket 50 portions.

Referring now to FIG. 1, an environmental view of the kit 10 depicting and in-use state upon a motorcycle 100, according to a preferred embodiment of the present invention, is disclosed. The kit 10 is shown here attached to a trike-style motorcycle 100; however, it is understood that the benefits of forwardly relocating passenger foot rest plates 30 may be achieved when applied to many makes, models, and styles of motorcycles 100, and as such should not be interpreted as a limiting factor of the invention. The kit 10 is believed to be especially beneficial on a trike-style motorcycle 100. The kit 10 allows a motorcycle passenger 200 riding behind a driver 205 in a conventional manner, to further extend their leg portions for a more comfortable riding experience. The kit 10 is designed for easy attachment and compatibility with many popular motorcycles 100. An existing motorcycle 100 is illustrated here having conventional and expected components such as, but not limited to: frame members 102, an engine 103, original passenger foot rests 104, and original driver foot rests 106.

The kit 10 includes a left bracket 20 having an adjustable foot rest plate 30, and a right bracket 50 also providing attachment of a foot rest plate 30 (only the left bracket 20 shown here). It also envisioned that the rest plate 30 may be purchased separately, if desired, so as to better match the original driver foot rest portions 106. The left 20 and right 50 brackets are to be made using sturdy steel bar stock sections being bent in a forging or similar metal forming process to form respective first extension bar 22 and second extension bar 52 portions to conform to a physical profile of the motorcycle 100. It is further envisioned that the metal portions of the kit 10 would be preferably chrome plated; however, for particular applications, a painted finish in a matching color may also be available, without limiting the scope of the kit 10. Attachment of the brackets 20, 50 would preferably utilize existing threaded peg-mounting features normally integral into side frame members 102 of the motorcycle 100, and would be fastened thereto using supplied threaded fasteners 80.

Figure 2A:
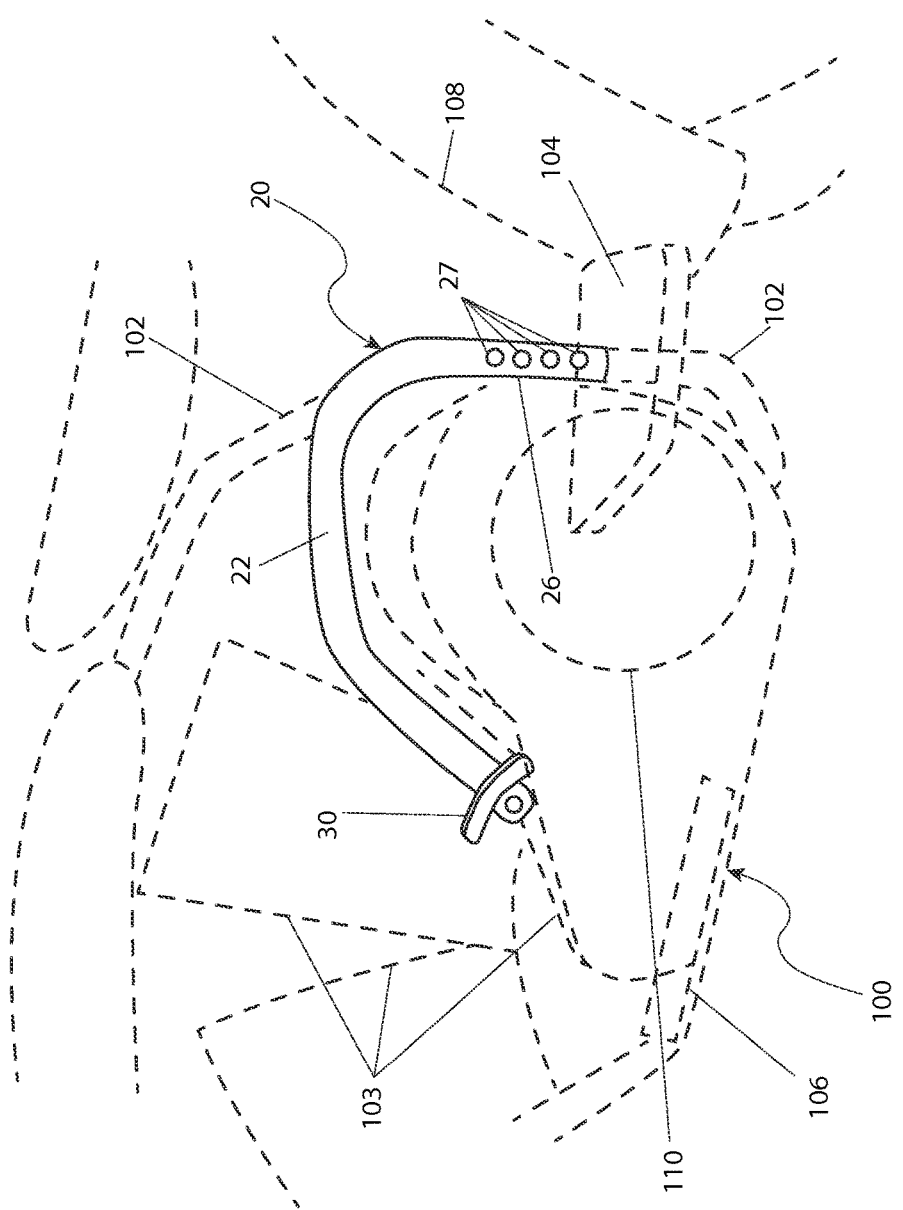
FIG. 2a is a side view of a left bracket portion 20 of the foot peg extension kit 10 depicting an installed state upon a motorcycle 100, according to a preferred embodiment of the present invention.

Referring now to FIGS. 2a, 2b, 2c, installed, top, and side views of the left bracket portion 20 of the kit 10, according to a preferred embodiment of the present invention, are disclosed. The left bracket 20 includes a formed first extension bar 22 having a general "U"-shape having an integral first mounting surface 26 at a rearward portion and a first fastener aperture 84a located at an opposing forward end. The first mounting surface 26 provides a vertical linear section having a plurality of equally-spaced mounting apertures 27. The mounting apertures 27 are envisioned to be approximately three-eighths of an inch (⅜ in.) in diameter, and spaced approximately three-quarters of an inch (¾ in.) apart; however, it is understood that the kit 10 would be introduced having actual aperture spacing and diameters which correspond to specific motorcycle applications, and as such should not be interpreted as a limiting factor of the invention.

An embodiment of the first extension bar portion 22 of the left bracket 20 is shown here including a first bend 24a and a second bend 24b resulting in an outwardly offset and overall arcuate shape, which when mounted to a particular motorcycle 100 having an engine 103 with a protruding clutch housing portion 110, as seen here, may be positioned so as to extend up and over the protruding clutch housing 110 to a position slightly behind and above the original driver foot rest portion 106. It is understood that various models of the first extension bar 22 may be introduced having differently positioned and number of bends 24a, 24b for mounting to various popular motorcycles 100.

The forward end of the first extension bar 22 includes a single horizontal first fastener aperture 84a which provides bolted attachment of an outwardly extending foot rest plate 30. The foot rest plate 30 provides a removably attachable platform onto which a passenger 200 may rest their foot. The foot rest plate 30 preferably provides a generally rectangular top surface being slightly convex front-to-rear and having an integral mounting ear portion 34 which protrudes perpendicularly downward along a bottom surface portion. The mounting ear 34 provides a centrally located third fastener aperture 84c. The foot rest plate 30 is rotatingly affixed to the first extension bar 22 by inserting a threaded fastener 80 such as a bolt through the third fastener aperture portion 84c of the first extension bar 22 and through the mounting ear 34, being subsequently secured using a corresponding nut fastener 82. The arcuate top surface of the foot rest plate 30 may be rotatingly and selectively positioned to comfortably support the foot of the passenger 200, and then fixed at the desired position by tightening the fasteners 80, 82. The foot rest plate 30 also includes a textured high-friction pad 32 located along a top surface being adhesively bonded, or otherwise affixed thereto. The high-friction pad 32 is envisioned to be made using a rubber sheet material or the like, to prevent a passenger's 200 foot from slipping, especially during wet conditions.

Figure 3A:
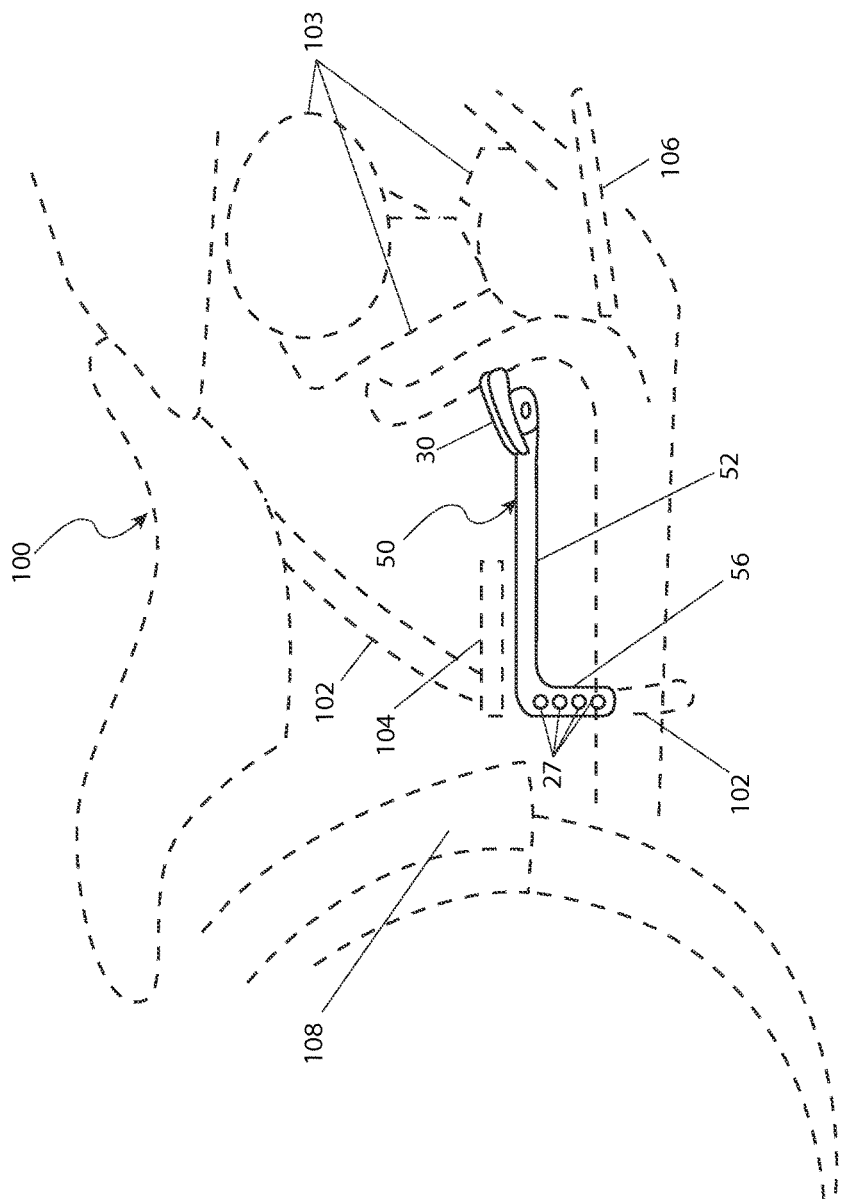
FIG. 3a is a side view of a right bracket portion 50 of the foot peg extension kit 10 depicting an installed state upon a motorcycle 100, according to a preferred embodiment of the present invention.
Figure 3B:
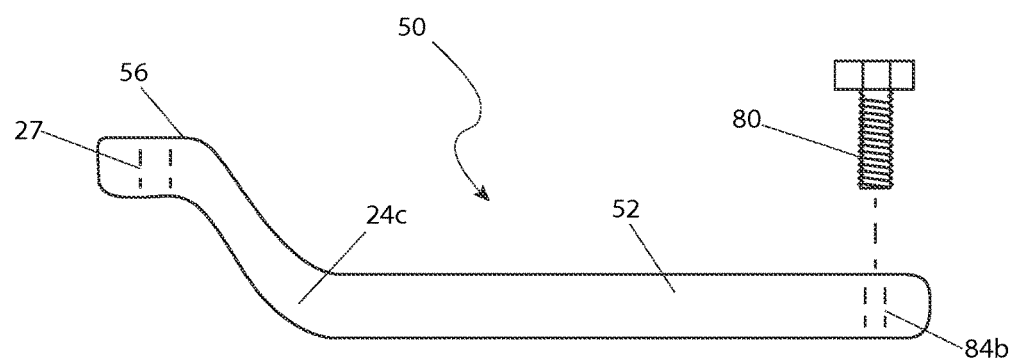
FIG. 3b is a top view of the right bracket 50, according to a preferred embodiment of the present invention; and, FIG. 3c is a side view of the right bracket 50 portion, according to a preferred embodiment of the present invention.
Figure 3C:
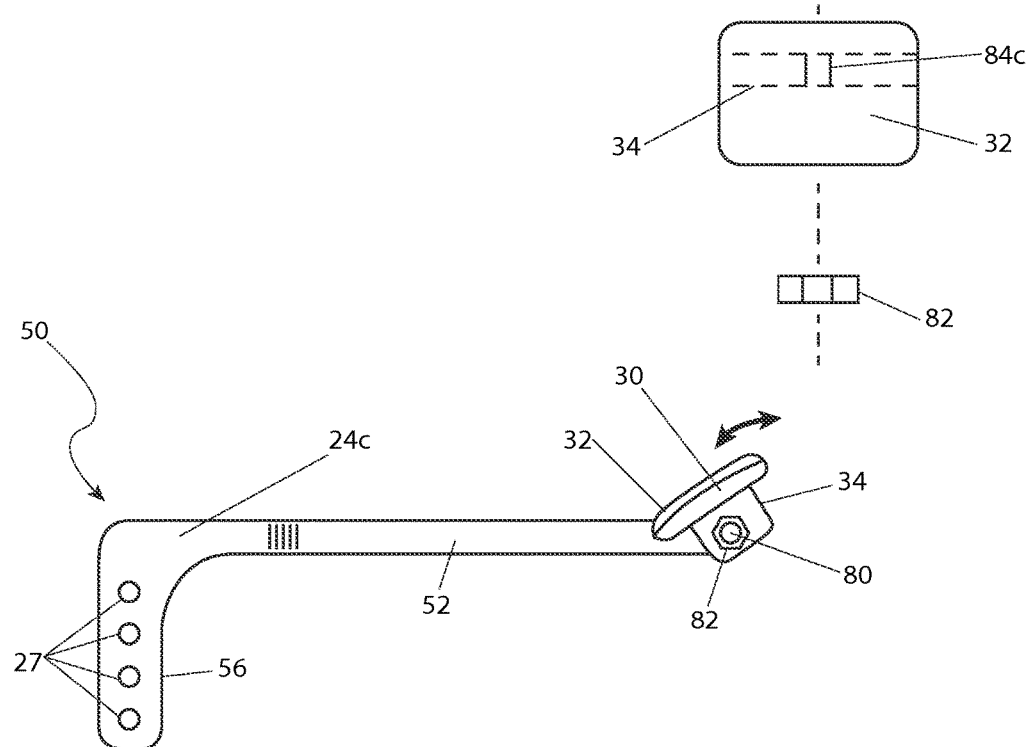

Referring now to FIGS. 3a, 3b, 3c, installed, top, and side views of the right bracket portion 50 of the kit 10 according to a preferred embodiment of the present invention, are disclosed. The right bracket 50 provides similar attachment means and functionality as the previously described left bracket 20. However due to physical variations between opposing side portions of the motorcycle 100, as well as a need to facilitate servicing the engine 103 on the right side, it is envisioned that the right bracket 50 would be formed differently than the left bracket 20. A particular embodiment of the right bracket 50 is shown here providing an outwardly offset and generally "L"-shaped form having a third bend 24c. The right bracket 50 includes a second extension bar 52 which provides similar attachment to existing frame members 102 of the motorcycle 100 as the left bracket 20. The second extension bar 52 includes a downwardly extending second mounting surface portion 56 at a rearward portion, also providing a plurality of mounting apertures 27, and a second fastener aperture 84b at a forward end. The mounting apertures 27 provide similar bolted attachment of the right bracket 50 to corresponding threaded features integrated into the existing frame members 102 of the motorcycle 100. The second fastener aperture 84b provides an attachment means to a respective third fastener aperture portion 84c of the remaining foot rest plate 30 (also see FIGS. 2b and 2c).

Upon installation of both bracket portions 20, 50 and foot rest plate portions 30, the foot rest plate portions 30 are envisioned to be positioned slightly behind and above the original driver foot rests 106, thereby allowing a motorcycle passenger 200 to extend their legs forwardly and rest their feet upon the foot rest plates 30 in a more comfortable manner.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the kit 10, it would be installed as indicated in FIGS. 1, 2a, and 3a.

The method of installing and utilizing the kit 10 may be achieved by performing the following steps: procuring a model of the kit 10 having a desired finish and being particularly configured for an existing motorcycle 100 onto which the kit 10 is to be installed; removing the original passenger foot rests 104 by removing the original attaching hardware; removing any interfering existing vanity panels temporarily, as needed, from respective frame members 102 of the motorcycle 100 to complete the installation; fastening the foot rest plates 30 to the respective left 20 and right 50 brackets, if not previously attached, by inserting the supplied threaded fasteners 80 through respective fastener aperture portions 84a, 84b of each bracket 20, 50, and through the third fastener apertures 84c of each foot rest plate 30, and securing with a supplied nut fastener 82; fastening the left bracket 20 and right bracket 50 portions, as well as reinstalling the original passenger foot rests 104 to the integral threaded features of the frame members 102, using the supplied threaded fasteners 80; adjusting the foot rest plates 30 in a rotating manner until obtaining comfortable contact with foot portions of the passenger 200; securing the foot rest plates 30 in position by tightening the respective threaded fasteners 80 and nut fasteners 82; replacing any other original portions of the motorcycle 100 having been temporarily removed during the installation process; and, benefiting from improved leg position of a motorcycle passenger 200 during a ride while utilizing the present invention 10.

It is understood that the kit 10 may be quickly removed from the motorcycle 100, and the original passenger foot rests 104 reinstalled to restore the motorcycle 100 to its original configuration. Additionally, the kit 10 may be installed upon another motorcycle 100 in like manner, if desired.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A foot peg extension kit, comprising:
    a left bracket, comprising:
        a first extension bar extending outwardly therefrom said left bracket comprising:
            a first extension bar mounting surface at a rearward end; and,
            a first extension bar fastener aperture located at an opposing forward end;
        wherein said first extension bar comprises a linear section and an offset and arcuate section between said rearward end and said forward end;
        wherein said first extension bar mounting surface comprises a plurality of mounting apertures which is linearly orientated subjacent a horizontal diameter of said first extension bar fastener aperture; and,
        wherein said first extension bar is configured to attach to a first vertical side frame member of a trike-style motorcycle;
    a first adjustable foot rest plate removably and rotatable about the latitudinal axis of a horizontally positioned fastener, directly attached to said left bracket comprising:
        a platform having a planar central portion with a first convex edge and a second convex edge opposite said first convex edge; and,
        a mounting ear portion integral to said platform and protruding perpendicularly downward from a bottom surface therefrom;
        wherein said mounting ear is rotatingly attached to said first extension bar;
    a right bracket comprising:
        a second extension bar extending outwardly therefrom said right bracket comprising:
            a second extension bar mounting surface at a rearward end; and,
            a second extension bar fastener aperture located at an opposing forward end;
        wherein said second extension bar comprises a linear section and an offset and arcuate section between said rearward end and said forward end;
        wherein said second extension bar mounting surface comprises a plurality of mounting apertures which is linearly orientated subjacent a horizontal diameter of said second extension bar fastener aperture; and,
        wherein said second extension bar is configured to attach to a second vertical side frame member of a trike-style motorcycle;
    a second adjustable foot rest plate removably and rotatable about the latitudinal axis of a horizontally positioned fastener, directly attached to said right bracket comprising:
        a platform having a planar central portion with a first convex edge and a second convex edge opposite said first convex edge; and,
        a mounting ear portion integral to said platform and protruding perpendicularly downward from a bottom surface therefrom;
        wherein said mounting ear is rotatingly attached to said second extension bar.

2. The kit of claim 1, wherein said left bracket further comprises an outwardly offset and generally "L"-shaped form.

3. The kit of claim 1, wherein said right bracket further comprises an outwardly offset and generally "L"-shaped form.

* * * * *